Patented Oct. 12, 1926.

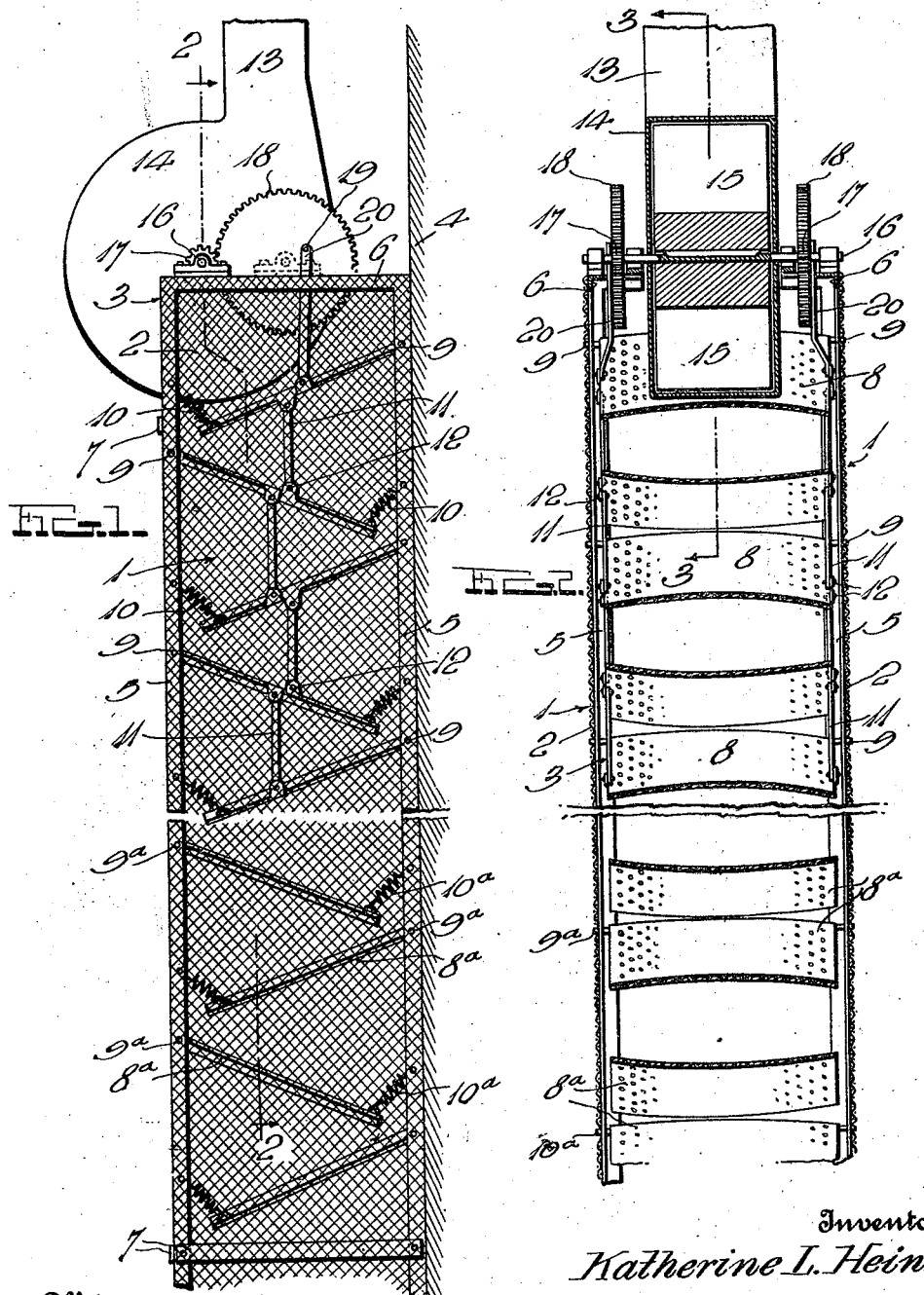

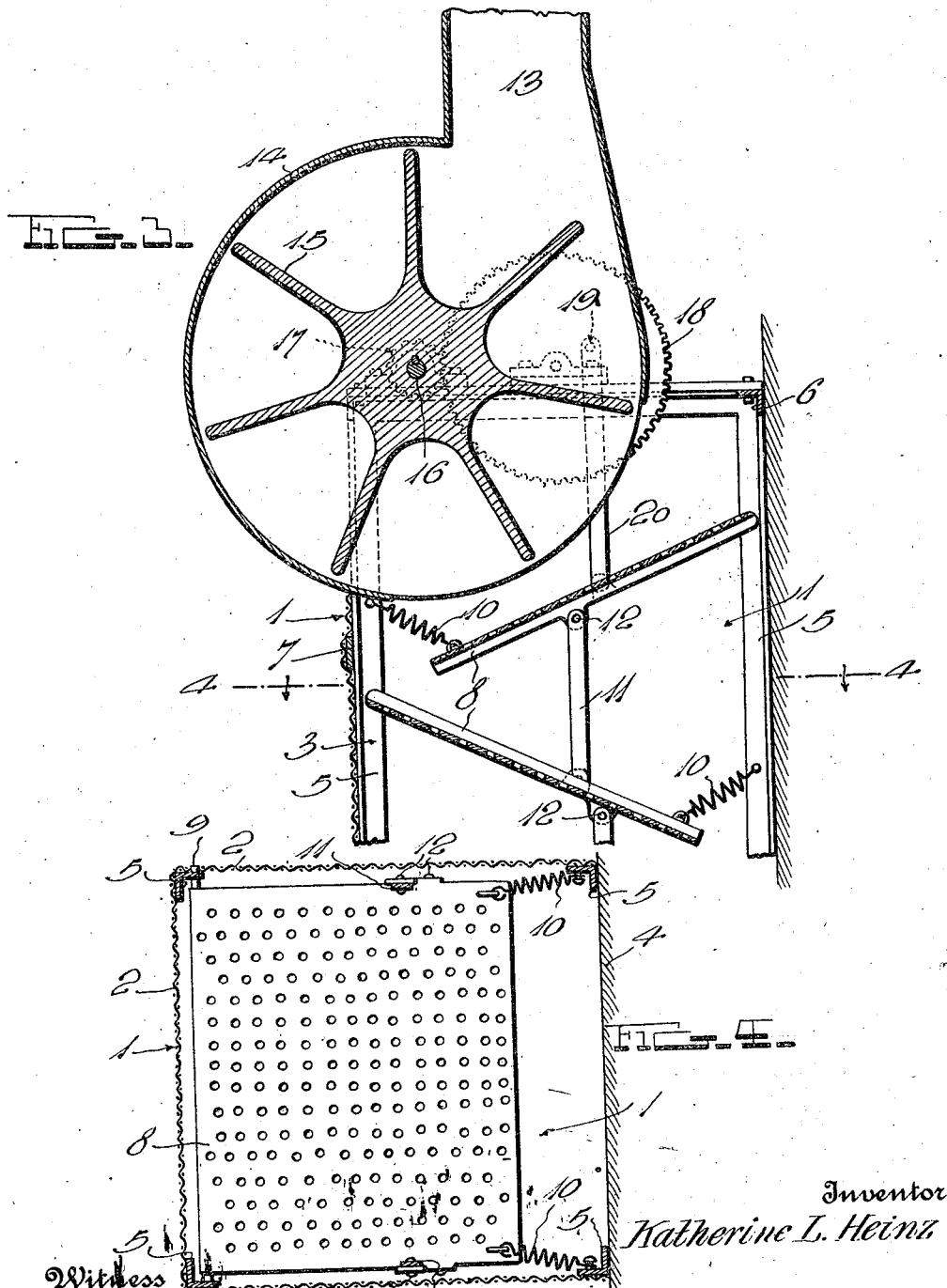

1,603,108

UNITED STATES PATENT OFFICE.

KATHERINE L. HEINZ, OF CHAMPAIGN, ILLINOIS.

GRAVITY-OPERATED GRAIN AERATOR.

Application filed March 23, 1925. Serial No. 17,788.

My invention has for its principal object to provide a novel form of grain aerating device including agitators for the grain and operating means for said agitators, driven by the grain fed to the device, so that no extraneous source of power is necessary to operate said agitators.

Another object is to embody the shakers in the form of inclined screens alternately arranged in a grain aerating passage, said screens being constructed to cause the grain to move toward the center of one screen and toward the edges of the next screen, and it may be explained that screens of this character need not in all instances be movable.

Another object of the invention is to provide a grain aerator which relies upon natural atmosphere and sun to produce the aerating effect.

With the foregoing and minor objects in view, the invention resides in the novel subject matter hereinafter described and claimed, the description being supplemented by the accompanying drawings.

Figure 1 is a side elevation of a grain aerator constructed in accordance with my invention.

Figure 2 is a vertical sectional view as indicated by line 2—2 of Fig. 1.

Figure 3 is an enlarged vertical sectional view as indicated by line 3—3 of Fig. 2.

Figure 4 is a horizontal section on line 4—4 of Fig. 3.

In the accompanying drawings which illustrate one form of my invention, the numeral 1 designates a vertically disposed grain aerating passage, three sides of which are preferably formed by woven wire 2 secured to an appropriate rigid frame structure 3, while the fourth side of said passage may well be formed by an elevator wall or the like 4. The frame 3 preferably includes four vertical, corner bars 5, preferably formed of angle metal, and the upper ends of these bars 5 are connected with horizontal bars 6. Also, at suitable intervals, the bars 5 may be connected by other transverse bars 7 (Fig. 1).

Within the upper portion of the passage 1, I have illustrated a plurality of inclined grain screens 8 extending alternately from opposite sides of said passage and pivoted to the corner bars 5, as indicated at 9, the pivots being at the upper ends of the screens, while coiled springs 10 are preferably connected to the lower ends thereof and anchored to any suitable parts, such as the corner bars 5. The numerous screens 8 are connected with each other by vertical links 11 pivoted at 12 thereto, so that all of said screens may vibrate vertically, in unison. Novel means is connected with these screens, or rather with the uppermost thereof, in the present disclosure, so as to produce a positive vibration of said screens, under the influence of the grain supplied to the passage 1.

At 13, I have shown a gravity chute for feeding the grain to the aerating passage 1, the lower end of said chute being provided, in the present form of construction, with a laterally bulged casing portion 14 in which a grain-driven paddle wheel 15 is rotatably mounted. I have shown the wheel 15 secured upon a shaft 16 mounted in appropriate bearings on certain of the bars 6, and pinions 17 have been shown upon the shaft 16 meshing with suitably mounted gears 18, which gears are connected by wrist pins or the like 19, and pitmen 20, with the uppermost of the screens 8.

It will be seen from the above, that the paddle wheel 15 is driven by the weight of the grain descending through the chute 13 and that said wheel will thus vibrate the screens 8. Also, the wheel will supply the grain intermittently to the uppermost screen 8, in measured quantities, permitting better operation of the aerating apparatus, than if a steady stream of grain were supplied.

The screens 8 are preferably in the form of perforated plates and the alternate screens are convex from end to end on their upper sides, while the intervening screens are convex on said upper sides from end to end. This construction causes the grain to spread out toward the edges of the alternate screens and to flow toward the centers of the intervening screens and the aerating operation is thus greatly facilitated, as it is insured that the sunlight and fresh air to which the passage 1 is subjected, shall come in contact with all of the grain. Some of the grain passes through the perforations in the screens 8 while the remainder slides from said screens onto those below.

In the lower portion of the passage 1, a plurality of pivotally mounted screens $8^a$ are preferably provided, mounted similarly to the screens 8 but free of positive vibrating means, said screens $8^a$ being pivoted at their upper ends as indicated at $9^a$ and yieldably supported at their lower ends by springs 10ª. The weight of the grain in falling upon the screens 8ª causes vibration thereof and by the time these screens have been reached by the grain, the latter has been loosened thoroughly by the forcible vibration of the upper screens 8, so that positive movement of the screens 8ª is not needed.

By providing a grain aerating apparatus constructed as or substantially as shown and described, it will be very efficient and there will be no cost for operation, other than general upkeep, as the supply of grain to the aerator is utilized to operate the grain agitators. Attention may also be directed to the fact that by having the passage 1 of openwork form, advantage may be taken of all sunlight and air currents, to utilize their natural effects, so that there is no expense for the production of heat or air currents.

As excellent results may be obtained from the general construction shown, it may well be followed, but within the scope of the invention as claimed, numerous minor changes may be made.

I claim:—

1. A grain aerating machine comprising movable means for agitating the grain, a grain chute to said agitating means through which the grain is fed by gravity, grain-driven means associated with said chute, and driving connections between said grain-driven means and said grain agitating means.

2. A grain aerating machine comprising means for agitating the grain, an inlet chute for said agitating means down which the grain is fed by gravity, said chute having a lateral enlargement, a grain-driven paddle wheel mounted in said enlargement and having its paddles disposed in the path of the grain, and driving connections between said paddle wheel and said grain agitating means.

3. A grain aerating machine comprising a vertically disposed grain aerating passage, movably mounted grain agitators in said passage, a chute for supplying the grain by gravity to said passage, grain-driven means associated with said chute, and operating connections between said grain-driven means and said agitators.

4. A grain aerating machine comprising a vertical grain aerating passage, grain agitators mounted in said passage, a chute for supplying the grain by gravity to the upper end of said passage, said chute having a lateral enlargement at its lower end, a grain-driven paddle wheel mounted in said enlargement with its paddles in the path of the grain, and operating connections between said paddle wheel and grain agitators.

5. A grain aerating machine comprising a vertically elongated aerating passage, inclined grain agitators in said passage extending alternately from opposite sides thereof, means for positively vibrating said grain agitator, additional pivotally mounted grain agitators in the lower portion of said passage, under the aforesaid agitators and extending alternately from opposite sides of said passage, and means yieldably supporting said additional agitators and permitting them to vibrate under the action of the descending grain.

6. A grain aerating machine comprising a vertically elongated aerating passage, a plurality of pivotally mounted grain agitators in said passage and extending alternately from opposite sides thereof, linkage connecting said agitators for oscillation in unison, a gravity chute for supplying grain to said passage, grain-driven means associated with said chute, and operating connections between said grain-driven means and the uppermost of said agitators.

7. A grain aerating machine comprising a vertically elongated passage member, and inclined grain screens within said passage member extending alternately from opposite sides thereof, alternate screens being convex on their upper sides from end to end, while the intervening screens are concave from end to end on said upper sides.

In testimony whereof I have hereunto affixed my signature.

KATHERINE L. HEINZ.